United States Patent [19]

Estanislao

[11] 4,251,488
[45] Feb. 17, 1981

[54] MEANS FOR HIGH PRESSURE PRODUCTION OF DIAMONDS

[76] Inventor: Antonio J. Estanislao, 622 - 22nd St., Oakland, Calif. 94612

[21] Appl. No.: 961,212

[22] Filed: Nov. 16, 1978

[51] Int. Cl.³ .......................... B01J 3/06; C01B 31/06
[52] U.S. Cl. .................................... 422/242; 100/214; 100/240; 219/50; 423/446; 425/77; 425/DIG. 26
[58] Field of Search .......................... 422/242, 129 US; 423/446; 425/77, DIG. 26; 219/50; 100/214, 240

[56] References Cited

U.S. PATENT DOCUMENTS

| | | | |
|---|---|---|---|
| 2,585,818 | 2/1952 | Moravec | 219/50 |
| 2,717,300 | 9/1955 | Tyne | 219/50 |
| 2,910,933 | 11/1959 | Danly | 100/214 |
| 2,947,609 | 8/1960 | Strong | 423/446 |
| 2,990,583 | 7/1961 | Barbera | 425/77 X |
| 3,011,043 | 11/1961 | Zeitlin et al. | 219/50 |
| 3,531,974 | 10/1970 | Bickley | 100/214 X |
| 3,567,896 | 3/1971 | Chang | 425/77 X |
| 3,761,215 | 9/1973 | Tondato | 100/214 X |
| 4,063,453 | 12/1977 | Gram | 100/214 X |

Primary Examiner—Joseph Scovronek
Attorney, Agent, or Firm—Edward Brosler; Merwyn G. Brosler

[57] ABSTRACT

A means for producing extremely high pressures especially adaptable for use in the art of diamond making, such means employing the expansion characteristics of materials and includes a member expandable in response to heat for applying pressure to diamond producing material.

8 Claims, 3 Drawing Figures

MEANS FOR HIGH PRESSURE PRODUCTION OF DIAMONDS

This application is derived from the disclosure document filed with the Patent Office under No. 073,895.

My invention relates to a pressure producing apparatus using the heat expansion characteristics of metals and liquids, and more particularly the application of such apparatus toward producing the pressures necessary for the formation of diamonds from diamond producing materials. The synthetic formation of diamonds is not a new art, however, the several methods currently commercially utilized have drawbacks generally in the areas of sustained high pressures which make the production of larger diamonds either unfeasible or too costly.

Prior art U.S. Pat. Nos. 2,941,248, 2,947,610, 4,036,937, 4,035,472 and 3,574,580 disclose various methods and apparatus for the forming of diamonds, some of which methods may be usable with applicant's pressure creating means. It is believed applicant's device will be innovative in this industry, and provide a basis for experimentation for even further innovation.

U.S. Pat. No. 4,035,472 describes a method of producing diamonds by subjecting the diamond producing material to a very high velocity impact whereby the shock imparted creates the necessary pressure and temperature.

Among the objects of my invention are:

1. To provide a novel and improved means for producing pressures great enough to produce diamonds from diamond producing material;
2. To provide a novel and improved means to facilitate the creation of diamonds of larger variety than are currently easily produced;
3. To provide a novel and improved means for using expansion characteristics of metals and liquids to create pressures necessary to produce diamonds from diamond producing materials;
4. To provide novel and improved means for using heat to create the high pressure necessary to produce diamonds from diamond producing materials.

Additional objects of my invention will be brought out in the following description of a preferred embodiment of the same as applied toward providing the great pressures required for production of diamonds, wherein.

Figure 1:
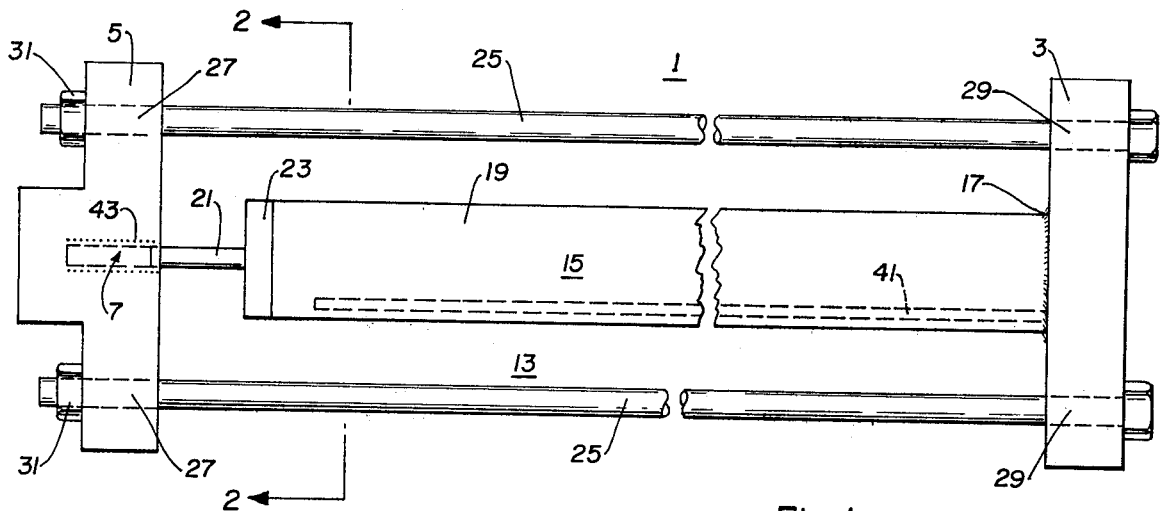
FIG. 1, is a side view in elevation depicting the invention as applied toward a diamond making function.
Figure 2:
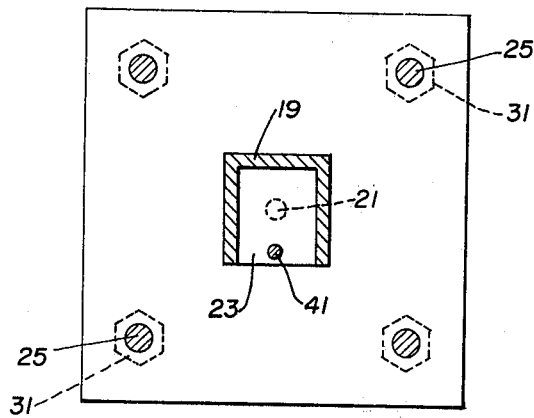
FIG. 2 is a view in section taken through the plane 2—2 to the invention of FIG. 1.
Figure 3:
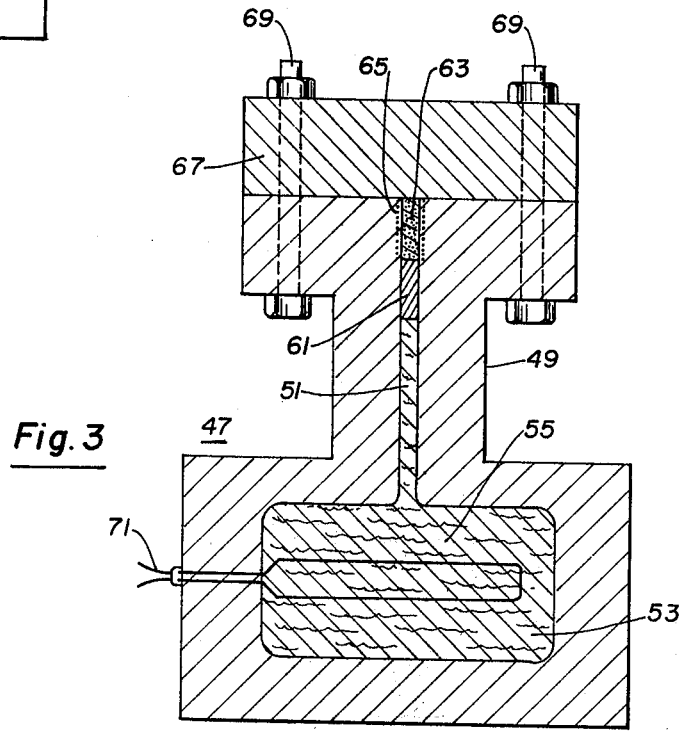
FIG. 3 is a view in section taken through an embodiment of the invention utilizing expansive characteristics of liquids.

Referring to the drawings for details of my invention in its preferred form, the same comprises a pressure producing means including an end plate 3, and anvil 5 having a recess 7 for receiving diamond producing material, means 13 for stabilizing the distance between the end plate and the anvil, and an expandable assembly 15 having one of its ends fixed with respect to the end plate by welds 17 or by other means leaving its free end expandable into such anvil recess 7. The expandable assembly 15 of the preferred embodiment is comprised of a lengthy U-shaped longitudinally expandable member 19 separated from a compression rod 21 affixed to its free end by an end cap 23. Such expandable member is preferably composed of a material having a relatively high coefficient of linear expansion such as steel, copper, aluminum or zinc. The greater the coefficient, the less required length will be necessary for the member.

Such means for stabilizing the distance between the anvil 5 and the end plate 7 comprises a plurality of long stabilizing rods 25 insertable through corresponding openings 27, 29 in the anvil and the end plate. The anvil is installable over the stabilizing rods with the free end of the compression rod 21 slidably aligned within and short of the end of the anvil recess. The rods are then secured with locking nuts 31 or any other convenient known locking means, bringing the compression rod into tight engagement with diamond producing material placed within the recess.

The formation of diamonds from such material needs to take place in the presence of heat and such pressure as can be generated by applicant's invention. With the anvil thus positioned as described in spaced relationship with the end plate, and with the free end of the compression rod in compressing relationship with diamond producing material placed within the anvil recess, the setting has been established. Heat in the presence of the material and expansion of the expandable member to compress the material are the remaining elements necessary to transform the diamond producing material into diamonds.

Toward this end, expansive heat is evenly applied to the expandable assembly for the purpose of causing longitudinal expansion of the expandable member 19 and conpression of the diamond producing material between compression rod 21 and the inner end of the anvil recess 7. One means of accomplishing this has been shown in the preferred embodiment as a gas heating assembly 41 within the space enclosed by the U-shaped expandable member along the longitudinal axis thereof. Heat thus produced is easily controlled externally by use of conventional controls that are readily accessible and well known, and such heat control is directly relatable to expansion control of said expandable member.

Also necessary for the production of diamonds is heat in the area of the material to be converted. To this end, my device utilizes a high resistance electrical element 43 of a conventional type surrounding the recess 7 in the anvil which is connectable through suitable controls to a power source. Such element is capable of heating the recess and the materials within to the temperature necessary, which, when coupled with the pressure created by the expandable member, provides the environment necessary to form diamonds from the diamond producing materials.

Another embodiment of the invention includes a thick walled hollow vessel 47 constructed of high strength steel or other substance of great strength. The vessel includes a neck 49 with an elongated entrance 51 to the hollow portion 53 within. The hollow 53 and most of the elongated entrance 51 are filled with a fluid 55 having a large coefficient of expansion. Resting on top of the column of fluid in the elongated entrance is slidably sealed contact with the walls of the entrance so as to prevent the escape of fluid, is a compression rod 61 similar in function to that of the principle embodiment. A space above the compression rod and below the top of the elongated entrance is utilized as a converting chamber 63 and is suitably surrounded by a heating means 65 to raise the temperature in this chamber. A cap 67 is then provided for closing such chamber to provide resistance to any pressures generated from within. This cap is tightly secured by plurality of locking rods 69 around the periphery of the top of the hollow chamber.

In use, a suitable supply of the necessary ingredients to produce diamonds are placed upon the top of the compression rod 61 in the converting chamber and the cap is locked into place. Heat is then applied to the converting chamber simultaneously with heat applied through an element 71 in the hollow chamber to heat the expandable fluid. The expansion of the fluid caused by such heat moves the expansion rod toward the cap causing compression of the material within the converting chamber; this coupled with the heat generated within the chamber will transform the material within the chamber into diamonds.

It should be noted that complete control of temperature within the converting chamber coupled with the separate control of the massive forces generated by the expandable member and expandable liquid by use of the expansive characteristic of such metals and liquids, provide the elements necessary to provide the transformation characteristic to larger converting chambers, thus providing the basis for the production of larger diamonds using a large chamber. It should also be noted the expandable member of the first embodiment need not necessarily be shaped as described, but may also be of other shapes as cylindrical, rectangular . . . etc., and may be heated in other manners i.e. indirectly.

From the foregoing description of my invention in its preferred form, it will become apparent that the same is subject to alteration and modification, without departing from any underlying principles involved, and I do not desire to be limited in my protection to the specific details illustrated and described, except as may be necessitated by the appended claims.

I claim:

1. Apparatus for creating diamonds comprising means for converting diamond producing material into diamonds upon exposure of such material in the presence of heat, said pressure producing means including an end plate, an anvil with a recess for receiving such diamond producing material, means stabilizing the distance between said end plate and said anvil, an unenclosed expandable assembly having one end fixed with respect to said end plate with the other end extendable into said anvil recess to a position short of the end of said recess, said expandable assembly including a member expandable in response to a rise in temperature, means for applying heat directly and only to said expandable member for raising such temperature of said expandable member for bringing about such expansion without undue heating of said entire apparatus and means for providing and controlling a heated environment for such material.

2. An apparatus for producing great pressures in accordance with claim 1, characterized by said expandable assembly including a compression rod with one end fixed to said free end of said expandable member with the other end slidably inserted into said anvil recess, whereby, expansion of said expandable member results in further insertion of said compression rod into said recess.

3. An apparatus in accordance with claim 2, characterized by said means for raising temperature of said expandable member including a gas heating means in alignment with the longitudinal axis of said expandable member and in proximity thereto; whereby, heat applied to said expandable member may be accurately controlled.

4. An apparatus in accordance with claim 3, characterized by said expandable member comprised of a material having a high coefficient of linear expansion.

5. An apparatus accordance in claim 1, characterized by said expandable member of comprising a U-shaped beam of a material having high coefficient of linear expansion whereby said shape of said member provides strength to said member as well as increased exposed surface for application.

6. An apparatus in accordance with claim 5, characterized by said means for raising temperature including gas heating means in longitudinal alignment with said U-shaped expandable member within the space enclosed by said U-shaped member whereby, heat may be applied evenly along the length of said expandable member, and such heat and resulting linear expansion of said member may be accurately controlled.

7. An apparatus in accordance with claim 1, characterized by said means providing a heated environment for said diamond producing material including a high resistance electrical element surrounding said anvil recess with controllable means externally for applying electrical current whereby, temperature within said anvil recess may be accurately and completely controlled.

8. Apparatus for creating diamonds comprising means for confining material capable of conversion to diamonds when exposed to heat and pressure, means for exposing such confined material in pressure relationship to a confined liquid having a high coefficient of expansion when heated, and means for heating such liquid to a temperature sufficient to pressurize and convert such material to diamonds, said pressure producing means including a thick walled hollow vessel having a neck, an elongated opening within said neck flow connected to the hollow within said vessel, a liquid expandable upon exposure to heat within said hollow extending up into but not reaching the top of said neck, a compression rod slidably resting in said elongated opening atop said fluid, a compression chamber defined by the space between the top of said compression rod and a tightly secured cap over the top of said neck, and means applying heat to said liquid whereby, the expansion of said liquid caused by application of heat to said liquid results in a compression movement of said compression rod against diamond producing material placed within said compression chamber.

* * * * *